United States Patent
Ladin (12)

(10) Patent No.: US 6,572,390 B2
(45) Date of Patent: Jun. 3, 2003

(54) APPARATUS FOR GROUNDING RAILWAY CONTACT RAILS

(75) Inventor: Dmitry Ladin, Ontario (CA)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/933,033

(22) Filed: Aug. 20, 2001

(65) Prior Publication Data

US 2003/0036294 A1 Feb. 20, 2003

(51) Int. Cl.$^7$ .......................... H01R 4/66; H01R 13/648
(52) U.S. Cl. .......................................................... 439/92
(58) Field of Search ..................... 439/92, 94; 81/426.5, 81/367, 370, 420

(56) References Cited

U.S. PATENT DOCUMENTS

| | | | | |
|---|---|---|---|---|
| 3,840,843 A | * | 10/1974 | Izraeli .......................... | 439/92 |
| 4,234,239 A | | 11/1980 | Wilmes et al. ................ | 439/94 |
| 4,820,901 A | * | 4/1989 | Peviani ......................... | 439/92 |
| 5,046,958 A | * | 9/1991 | Brown ......................... | 439/92 |
| 5,240,423 A | | 8/1993 | Morrison ..................... | 439/92 |

OTHER PUBLICATIONS

Copy of International Search Report for PCT/US02/26139.

\* cited by examiner

Primary Examiner—Javaid Nasri
(74) Attorney, Agent, or Firm—Myers Bigel Sibley & Sajovec

(57) ABSTRACT

Hand-held tools for gripping a railway contact rail to facilitate grounding thereof are provided. A first member includes a first jaw at an end thereof, a handle at an opposite end thereof, and a first intermediate portion extending between the first jaw and the handle. A second member is pivotally attached to the first member and includes a second jaw at an end thereof, a set of ratchet teeth at an opposite end thereof, and a second intermediate portion extending between the second jaw and the set of ratchet teeth. The first and second jaws are configured to pivot relative to each other so as to grip respective opposite side portions of a railway contact rail when the handle is moved downwardly such that the second intermediate portion is in electrical contact with a top portion of a railway contact rail. A pawl extends from the first intermediate portion and is configured to engage the set of ratchet teeth to hold the first and second jaws in contact with the respective opposite sides of a railway contact rail. A biasing member is operatively associated with the pawl and is configured to urge the pawl into engagement with the set of ratchet teeth. A release lever is operatively associated with the biasing member and/or the pawl and is configured to disengage the pawl from the set of ratchet teeth and allow movement of the handle so as to disengage the hand-held tool from a contact rail.

16 Claims, 7 Drawing Sheets

APPARATUS FOR GROUNDING RAILWAY CONTACT RAILS

FIELD OF THE INVENTION

The present invention relates generally to clamping devices and, more particularly, to clamping devices for railway rails.

BACKGROUND OF THE INVENTION

A conventional railway track includes a pair of elongated running rails that receive the wheels of train cars thereon. The running rails are spaced laterally apart from one another and extend longitudinally and in substantially parallel relation to one another. For electric-powered train cars, such as subways and the like, a third rail is located adjacent to one of the running rails and is energized with electrical current and serves as the power supply for the electrical motors of electric-powered train cars. Electric-powered train cars typically have one or more steel collector shoes that contact the top portion of a contact rail for transferring electrical current from the contact rail to a train car's electric motors.

FIG. 1 illustrates a conventional arrangement of railway running rails 10 and an adjacent contact rail 12 for supplying electrical power. The contact rail 12 rests on elevated insulators 13 that are spaced apart along the railway. The wheels 14 of a train car engage and roll along the running rails 10 and a collector shoe 16 is in contact with the top portion 12a of the contact rail 12 and receives electrical power therefrom.

Because electrically energized contact rails are dangerous, a protection cover 18 is conventionally utilized as illustrated in FIG. 1, particularly in areas where passengers may be present, such as loading platforms, etc. A protection cover 18 is conventionally mounted over the top portion 12a of a contact rail 12, as illustrated. Conventionally, a gap of about 3 inches is provided between the top portion 12a of a contact rail 12 and the bottom 18a of a protection cover 18. However, this gap may vary. Conventionally, contact rail protection covers are permanently attached and cannot be removed, even for maintenance on the contact rail.

During railway maintenance work (e.g., replacing old or damaged rails, electrical circuit rewiring, construction, etc.), a contact rail is conventionally discharged or grounded once the electrical power is turned off. Conventionally, grounding of a contact rail is accomplished by connecting an electrical cable between the contact rail and the running rail farthest away from the contact rail.

Unfortunately, the confined space between a contact rail and an overlying protection cover may make it difficult to apply a conventional clamp (e.g., a "C-clamp") to the contact rail. Accordingly, railway maintenance crews typically employ a "homemade" clamping device that is configured to clamp on to a contact rail as illustrated in FIG. 2. The illustrated clamping device 20 includes an electrically conductive "hook-up" pad 22 (e.g., a copper pad) with a chain 24 and a T-handle 26. The hook-up pad 22 is placed on the top portion 12a of a contact rail 12 and is held in place via a U-shaped holder 23 and a chain 24. The chain 24 is tightened around the pad holder 23 and the contact rail 12 via the T-handle 26. An electrical cable 28 extends from the clamping device 20 to a clamping device 30 attached to a running rail 10. The contact rail 12 is grounded to the running rail 10 via the electrical cable 28.

Unfortunately, installation of conventional clamping devices on contact rails can be time consuming and inconvenient. Moreover, conventional clamping devices can be dangerous because a person installing the clamping device may be required to come very close to an energized contact rail. This may be hazardous even if the person is wearing required protective clothing. Accordingly, there is a need for clamping devices that are quick and easy to install on energized contact rails protected by overhead covers and that can reduce the chances of operator exposure to an energized contact rail.

SUMMARY OF THE INVENTION

In view of the above discussion, hand-held tools for gripping a railway contact rail to facilitate grounding thereof are provided. According to embodiments of the present invention, a hand-held tool includes first and second members pivotally attached. The first member includes a first jaw at an end thereof, a handle at an opposite end thereof, and a first intermediate portion extending between the first jaw and the handle. The second member includes a second jaw at an end thereof, a set of ratchet teeth at an opposite end thereof, and a second intermediate portion extending between the second jaw and the set of ratchet teeth. The first and second jaws are configured to pivot towards each other and grip respective opposite sides of a railway contact rail when the handle is pivoted in a downwardly direction.

According to embodiments of the present invention, a pawl extends from the first intermediate portion and engages the set of ratchet teeth to hold the first and second jaws in contact with the respective opposite sides of a railway contact rail. A spring operatively associated with the pawl is configured to urge the pawl into engagement with the set of ratchet teeth. A release lever operatively associated with the biasing member and/or the pawl is configured to disengage the pawl from the set of ratchet teeth and to allow movement of the handle so that the first and second jaws can be disengaged from the contact rail.

According to embodiments of the present invention, one or more roller members may be located at the first and second jaws to facilitate installation of the hand-held tool on a contact rail.

Hand-held tools according to embodiments of the present invention can operate within very narrow spaces, thus allowing operators to quickly and easily grip an energized contact rail protected by an overhead protection cover while maintaining a safe distance therefrom.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
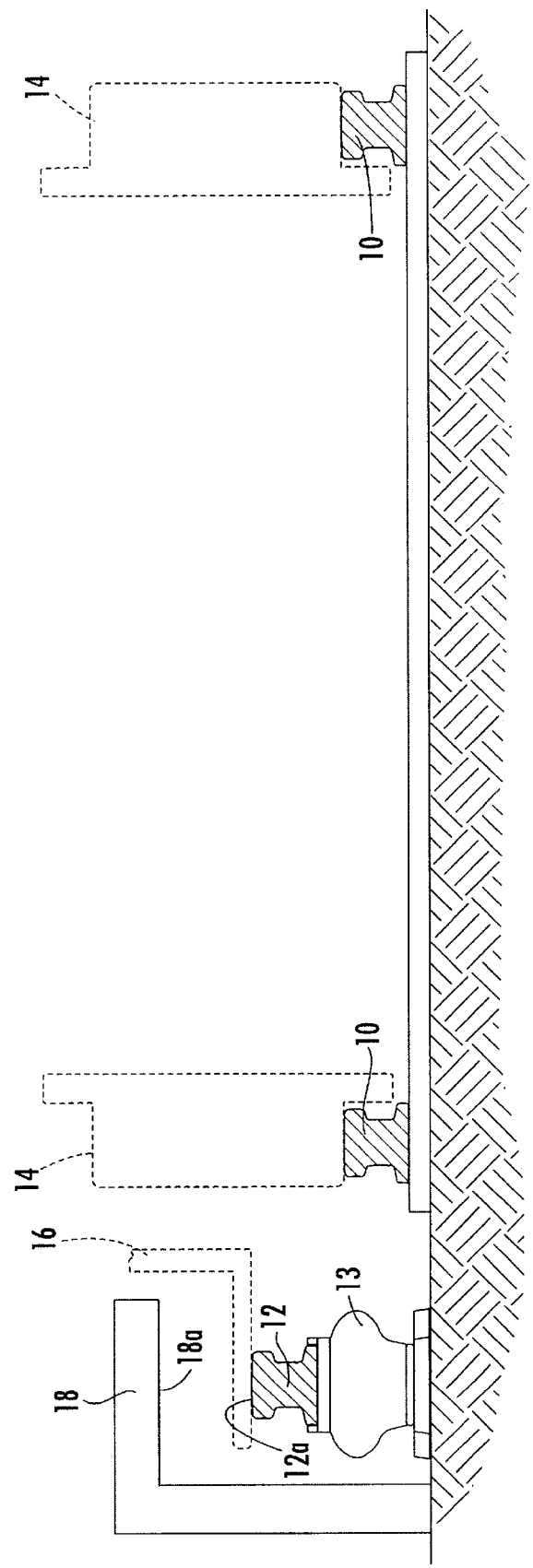
FIG. 1 illustrates a conventional three-rail railway system having a pair of running rails and an adjacent electrically energized contact rail.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Figure 3:
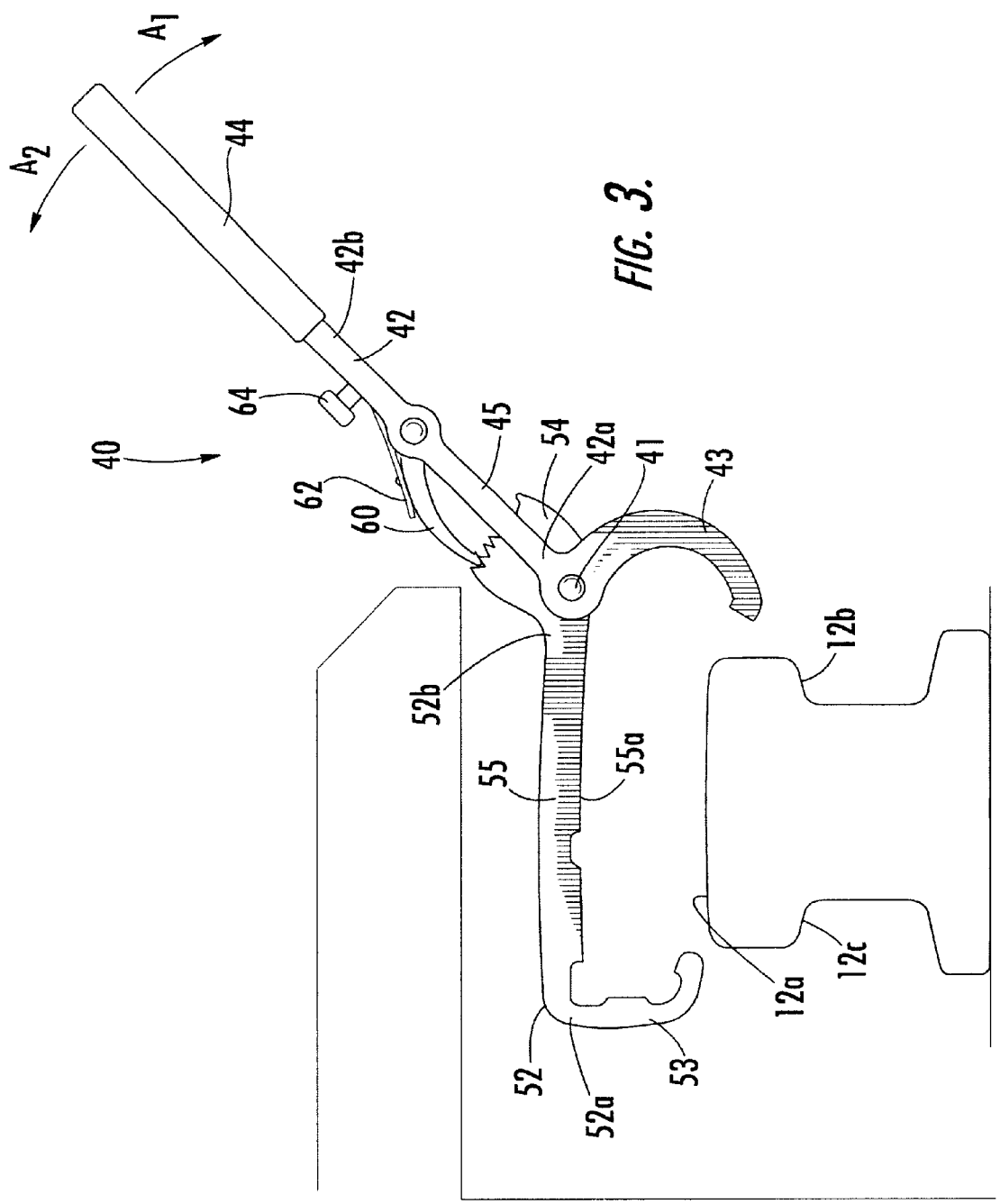
FIG. 3 illustrates a hand-held tool for gripping a contact rail and for facilitating grounding thereof, according to embodiments of the present invention.
Figure 4:
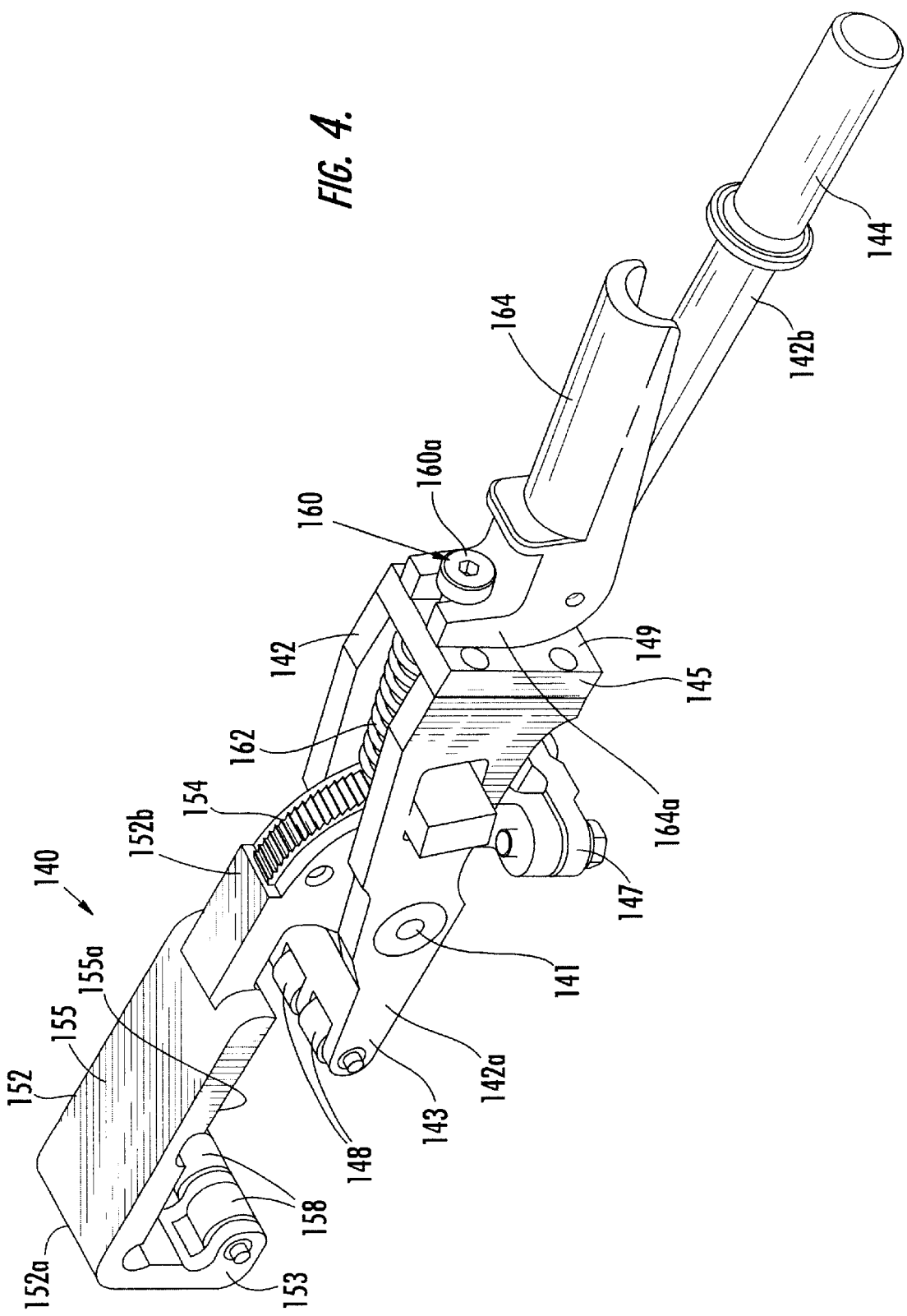
FIG. 4 illustrates a hand-held tool for gripping a contact rail and for facilitating grounding thereof, according to additional embodiments of the present invention.
Figure 5:
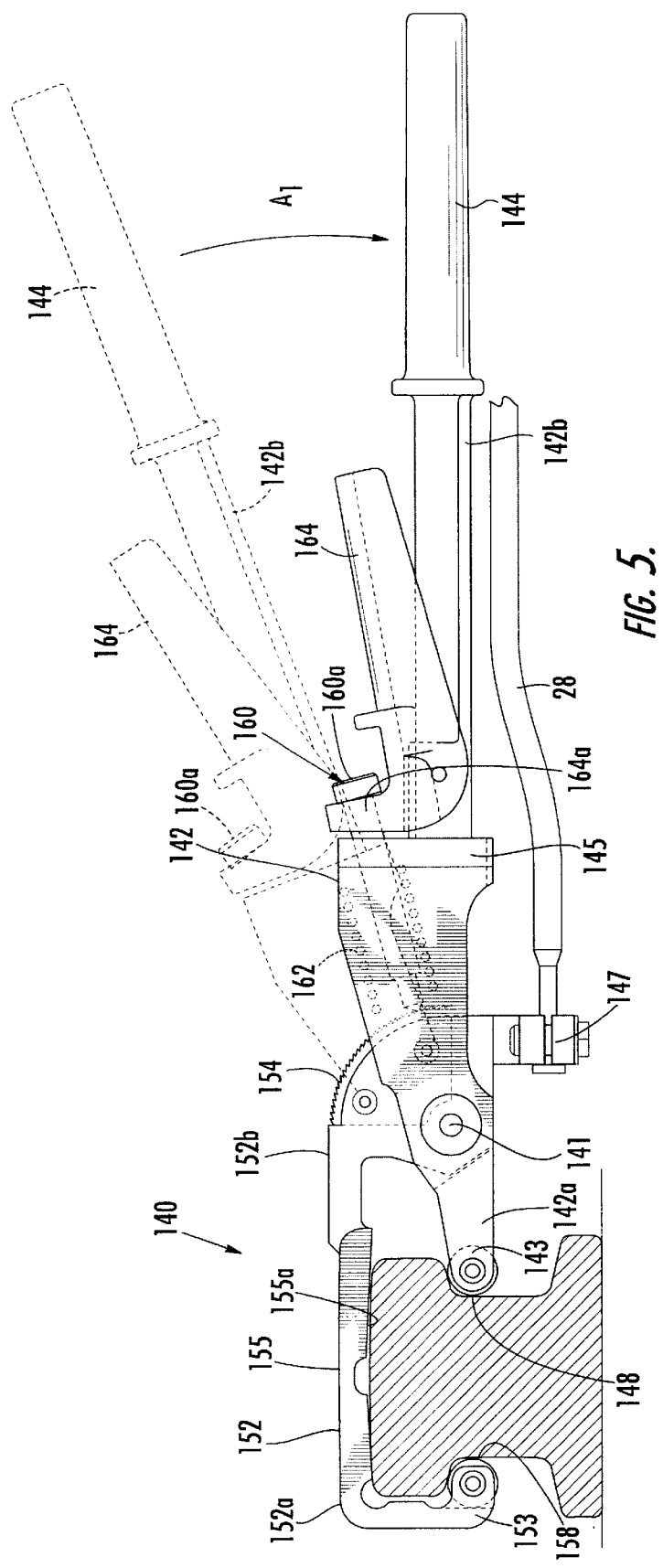
FIG. 5 illustrates the hand-held tool of FIG. 4 in an installed configuration and illustrates the direction that an operator moves the handle to secure the first and second jaws to the respective side portions of the contact rail.
Figure 6:
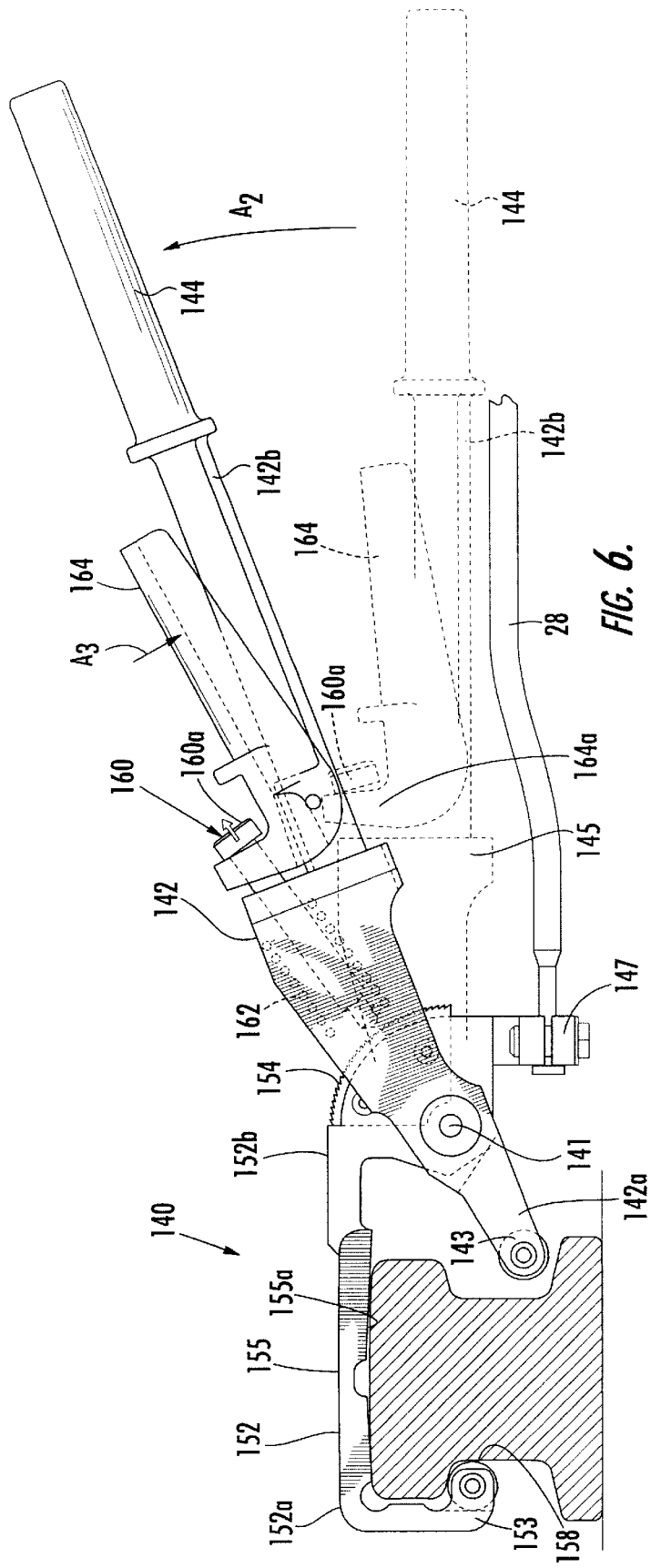
FIG. 6 illustrates the hand-held tool of FIG. 4 in an un-installed configuration and illustrates the directions that an operator moves the release lever and the handle to disengage the first and second jaws from the respective sides of the contact rail.

Referring now to FIG. 3, a hand-held tool 40 for gripping a railway contact rail to facilitate grounding thereof, according to one embodiment of the present invention, is illustrated. The hand-held gripping tool 40 includes first and second members 42, 52 pivotally attached to each other via pin 41. The illustrated first member 42 includes a first jaw 43 at an end 42a thereof, a handle 44 at an opposite end 42b thereof, and a first intermediate portion 45 that extends between the first jaw 43 and the handle 44.

The illustrated second member 52 includes a second jaw 53 at an end 52a thereof, a set of ratchet teeth 54 at an opposite end thereof, and a second intermediate portion 55 that extends between the second jaw 53 and the set of ratchet teeth 54. The first and second jaws 43, 53 of the first and second members 42, 52 are configured to pivot towards each other and grip respective opposite side portions 12b, 12c of a railway contact rail 12 when an operator moves the handle 44 in a downwardly direction (indicated by arrow $A_1$).

The second intermediate portion 55 of the second member 52 may have a flexible configuration relative to the first member 42 to facilitate good electrical contact between the contact surface 55a of the second intermediate portion 55 and a top portion 12a of a contact rail when the first and second jaws 43, 53 grip respective opposite side portions 12b, 12c of the contact rail. A flexible configuration of the second intermediate portion 55 may also facilitate installation of the hand-held tool 40 on contact rails that vary in height (e.g., because of wear, etc.).

Figure 2:
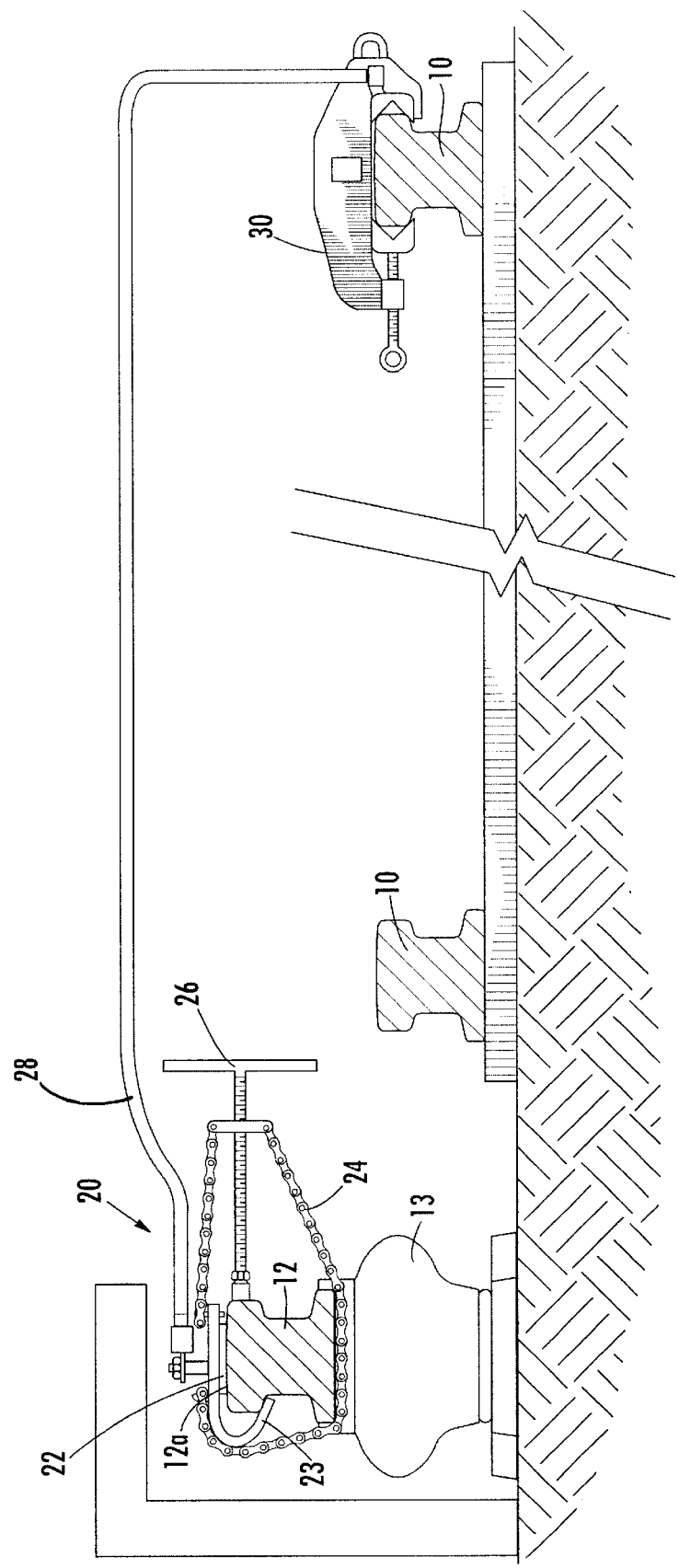
FIG. 2 illustrates a conventional grounding apparatus for grounding a contact rail to a running rail.

According to embodiments of the present invention, a replaceable electrically conductive pad (e.g., similar to electrically conductive pad 12 illustrated in FIG. 2), such as a copper pad, may be attached to the contact surface 55a of the second intermediate portion 55 to enhance electrical contact with the top portion 12a of a contact rail 12. The replaceable conductive pad may also reduce wear on the second intermediate portion contact surface 55a.

In the illustrated embodiment, a pawl 60 extends from the first intermediate portion 45 of the first member 42 and is configured to engage the set of ratchet teeth 54 on the second member 52. The pawl 60 is configured to hold the first and second jaws 43, 53 in contact with the respective opposite side portions 12b, 12c of the railway contact rail 12 when the handle 44 is pivoted in the downwardly direction (indicated by arrow $A_1$). A biasing member 62 (e.g., a leaf spring as illustrated) is operatively associated with the pawl 60 and is configured to urge the pawl 60 into engagement with the set of ratchet teeth 54. A release lever 64 is attached to the first member and is operatively associated with the biasing member 62 for disengaging the pawl 60 from the set of ratchet teeth 54 such that the handle 44 can move upwardly (indicated by arrow $A_2$) to force the first and second jaws 43, 53 away from each other, thereby disengaging the contact rail.

The use of the pawl 60 and ratchet teeth 54 allows the hand-held tool 40 to be utilized on contact rails of varying height. As is known to those skilled in the art, contact rails may vary in height as a result of wear. Moreover, use of the pawl 60 and ratchet teeth 54 provides an increased margin of safety since, once engaged, the likelihood of accidental disengagement is reduced.

Referring now to FIGS. 4–7, a hand-held tool 140 for gripping a railway contact rail to facilitate grounding thereof, according to additional embodiments of the present invention, is illustrated. The illustrated hand-held tool 140 includes first and second members 142, 152 pivotally attached to each other via pin 141. The illustrated first member 142 includes a first jaw 143 at an end 142a thereof, a handle 144 at an opposite end 142b thereof, and a first intermediate portion 145 that extends between the first jaw 143 and the handle 144. The illustrated handle 144 is welded to plate 149 which is attached (e.g., attached via hex-head machine thread screws, as illustrated) to first member 142. However, embodiments of the present invention are not limited to this handle attachment configuration. Various ways of attaching the handle 144 to the first member 142 (as well as ways of attaching other components of the hand-held tool 140) may be utilized.

The illustrated second member 152 includes a second jaw 153 at an end 152a thereof, a set of ratchet teeth 154 at an opposite end thereof, and a second intermediate portion 155 that extends between the second jaw 153 and the set of ratchet teeth 154. The first and second jaws 143, 153 of the first and second members 142, 152 are configured to pivot relative to each other so as to grip respective opposite side portions 12b, 12c of a railway contact rail when an operator moves the handle 144 downwardly. A ferrule clamp 147 is located at the bottom of the illustrated first member 142 that is configured to securely grip the grounding cable 28.

A pair of rollers 148 are located at the first jaw 143, and a pair of rollers 158 are located at the second jaw 153, as illustrated. The rollers 148, 158 facilitate installation of the hand-held tool 140 on a contact rail 12. For example, the rollers 158 on the second jaw 158 allow the second jaw 153 to roll around the top portion 12a of a contact rail 12. The rollers 148 on the first jaw facilitate gripping the contact rail 12 when the handle 144 is moved downwardly. In an installed configuration, the rollers 148, 158 are configured to contact respective side portions 12b, 12c of a railway contact rail 12.

The second intermediate portion 155 of the second member 152 may have a flexible configuration relative to the first member 142 to facilitate good electrical contact between the contact surface 155a of the second intermediate portion 155 and a top portion 12a of a railway contact rail 12 when the first and second jaws 143, 153 grip respective opposite side portions 12b, 12c of a railway contact rail 12. A flexible configuration of the second intermediate portion 155 may also facilitate installation of the hand-held tool 140 on contact rails that vary in height. Contact surface 155a is preferably formed from a material such as aluminum so that damage to the contact rail top portion 12a is prevented when the hand-held tool 140 is clamped to the contact rail 12.

According to embodiments of the present invention, a replaceable electrically conductive pad (e.g., similar to electrically conductive pad 12 illustrated in FIG. 2), such as a copper pad, may be attached to the contact surface 155a of the second intermediate portion 155 to enhance electrical contact with the top portion 12a of a contact rail 12. The replaceable conductive pad may also reduce wear on the second intermediate portion contact surface 155a.

In the illustrated embodiment, a shoulder bolt and pawl assembly 160 extends from the first intermediate portion 145 of the first member 142 and is configured to engage the set of ratchet teeth 154 on the second member 152. The pawl portion (not shown) of the shoulder bolt and pawl assembly 160 includes a plurality of teeth configured to engage the set of ratchet teeth 154 on the second member 152, as would be understood by those skilled in the art. The shoulder bolt and pawl assembly 160 is configured to hold the first and second jaws 143, 153 in contact with the respective opposite side portions 12b, 12c of a railway contact rail 12 when the handle 144 is pivoted in a downwardly direction (indicated by arrow $A_1$ in FIG. 5). A coil spring 162 serves as a biasing member and is operatively associated with the shoulder bolt and pawl assembly 160 to urge the shoulder bolt and pawl assembly 160 into engagement with the set of ratchet teeth 154. In the illustrated embodiment, the coil spring 162 coaxially surrounds the shoulder bolt and pawl assembly 160.

Embodiments of the present invention are not limited to the shoulder bolt and pawl assembly 160. Various devices and pawl-type configurations may be used to hold the first and second jaws 143, 153 in contact with the respective opposite side portions 12b, 12c of a railway contact rail 12 according to spirit and intent of the present invention.

A release lever 164 is attached to the first member and is operatively associated with the shoulder bolt and pawl assembly 160 and configured to disengage the shoulder bolt and pawl assembly 160 from the set of ratchet teeth 154 such that the handle 144 can move upwardly (indicated by arrow $A_2$ in FIG. 6) to force the first and second jaws 143, 153 away from each other, thereby releasing the contact rail 12. In the illustrated embodiment, an end portion 164a of the release lever 164 engages an end 160a of the shoulder bolt and pawl assembly 160 that extends outwardly from the coil spring 162. As the release lever 164 is moved downwardly towards the handle 144, the release lever end portion 164a pulls the shoulder bolt and pawl assembly 160 outwardly from the set of ratchet teeth so that the handle 144 is free to move.

The provision of the shoulder bolt and pawl assembly 160 and ratchet teeth 154 allows the hand-held tool 140 to be utilized on contact rails of varying heights. Moreover, use of the shoulder bolt and pawl assembly 160 and ratchet teeth 154 may provide an increased margin of safety since, once engaged, the likelihood of accidental disengagement is reduced.

In operation, the illustrated hand-held tool 140 is carried to a contact rail 12 in an opened position, moved under a rail overhead protection cover 18, and lowered down to the top portion 12a of the contact rail 12. The handle 144 is then moved downwardly (indicated by arrow $A_1$) to the "closed" position (FIG. 5) whereupon the first and second jaws 143, 153 snugly engage the respective side portions 12b, 12c of the contact rail 12. The shoulder bolt and pawl assembly 160 locks the first and second jaws 143, 153 in the installed position via the set of ratchet teeth 154.

To disengage the hand-held tool 140 from a contact rail 12 (FIG. 6), the release lever 164 is pressed towards the first member 142 (indicated by arrow $A_3$). The release lever 164 pulls the shoulder bolt and pawl assembly 160 against the coil spring 162 such that the shoulder bolt and pawl assembly 160 becomes disengaged from the set of ratchet teeth 154, thereby allowing the first jaw 143 to be freely articulated via upwardly movement (indicated by arrow $A_2$) of the handle 144. In the illustrated embodiment, the release lever 164 is small in size, relative to the handle 144, and is located close to the set of ratchet teeth 154, in order to reduce the chance of an operator accidentally pressing the release lever 164.

Figure 7:
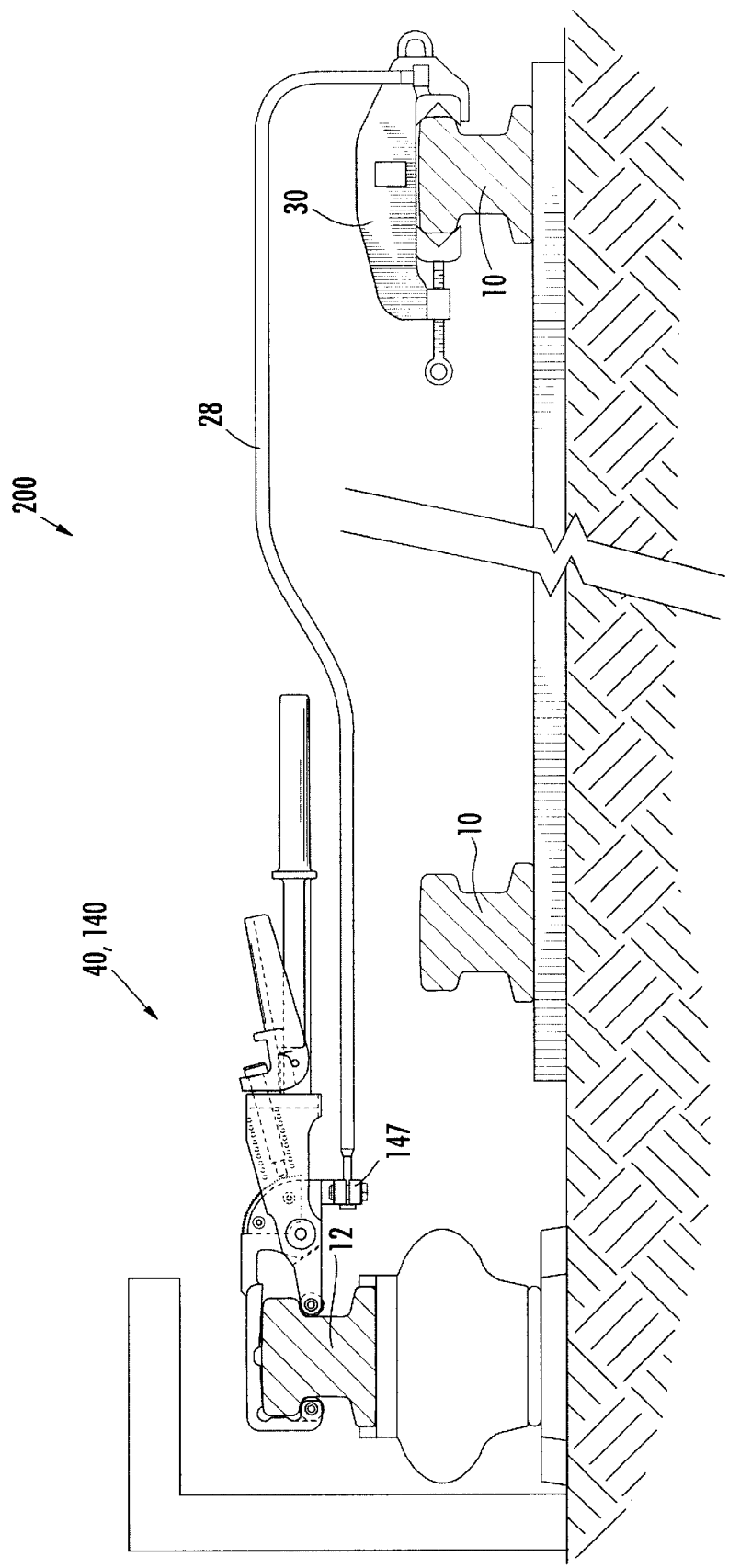
FIG. 7 illustrates a grounding apparatus for grounding an energized contact rail to a running rail according to embodiments of the present invention.

Referring to FIG. 7, a grounding apparatus 200 for grounding an energized contact rail 12 to a running rail 10 according to embodiments of the present invention is illustrated. The grounding apparatus 200 includes an electrically conductive clamp 30 that is configured to is releasably grip a railway running rail, an electrically conductive hand-held tool 40 (FIG. 3), 140 (FIG. 4) that is configured to releasably grip a contact rail 12, and an electrically conductive cable 28 in electrical communication with the clamp 30 and the hand-held tool 40, 140 such that the railway contact rail 12 is grounded to the railway running rail 10. Exemplary clamping devices 30 which may be used to grip a railway running rail in accordance with embodiments of the present invention are available from Hubbell, Inc., 584 Derby Milford Road, Orange, Conn.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A hand-held tool for gripping a railway contact rail to facilitate grounding thereof, comprising:
   a first member comprising a first jaw at an end thereof, a handle at an opposite end thereof, and a first intermediate portion extending between the first jaw and the handle;

a second member pivotally attached to the first member, the second member comprising a second jaw at an end thereof, a set of ratchet teeth at an opposite end thereof, and a second intermediate portion extending between the second jaw and the set of ratchet teeth, wherein the first and second jaws are configured to pivot towards each other and grip respective opposite side portions of a railway contact rail when the handle is pivoted in a first direction such that the second intermediate portion is in electrical contact with the railway contact rail; and a pawl extending from the first member that is configured to engage the set of ratchet teeth and hold the first and second jaws in contact with the respective opposite side portions of the railway contact rail when the handle is pivoted in the first direction.

2. The hand-held tool of claim 1, further comprising an electrically conductive pad attached to the second intermediate portion that is configured to make electrical contact with the railway contact rail.

3. The hand-held tool of claim 1, further comprising a biasing member operatively associated with the pawl that is configured to urge the pawl into engagement with the set of ratchet teeth.

4. The hand-held tool of claim 3, further comprising a lever operatively associated with the biasing member and configured to disengage the pawl from the set of ratchet teeth and allow movement of the handle in a second direction opposite to the first direction.

5. The hand-held tool of claim 1, wherein the first jaw comprises a roller configured to contact the railway contact rail.

6. The hand-held tool of claim 1, wherein the second jaw comprises a roller configured to contact the railway contact rail.

7. A hand-held tool for gripping a railway contact rail to facilitate grounding thereof, comprising:

a first member comprising a first jaw at an end thereof, a handle at an opposite end thereof, and a first intermediate portion extending between the first jaw and the handle;

a second member pivotally attached to the first member, the second member comprising a second jaw at an end thereof, a set of ratchet teeth at an opposite end thereof, and a second intermediate portion extending between the second jaw and the set of ratchet teeth, wherein the first and second jaws are configured to pivot towards each other and grip respective opposite side portions of a railway contact rail when the handle is pivoted in a first direction such that the second intermediate portion makes electrical contact with a top portion of the railway contact rail;

a pawl extending from the first member that is configured to engage the set of ratchet teeth and hold the first and second jaws in contact with the respective opposite side portions of the railway contact rail when the handle is pivoted in the first direction;

a biasing member operatively associated with the pawl that is configured to urge the pawl into engagement with the set of ratchet teeth; and a lever operatively associated with the pawl and configured to disengage the pawl from the set of ratchet teeth and allow movement of the handle in a second direction opposite to the first direction.

8. The hand-held tool of claim 7, further comprising an electrically conductive pad attached to the second intermediate portion that is configured to make electrical contact with the railway contact rail.

9. The hand-held tool of claim 7, wherein the first jaw comprises a roller configured to contact the railway contact rail.

10. The hand-held tool of claim 7, wherein the second jaw comprises a roller configured to contact the railway contact rail.

11. An apparatus for grounding a railway contact rail, comprising:

an electrically conductive clamp that is configured to releasably grip a railway running rail;

an electrically conductive hand-held tool that is configured to releasably grip a railway contact rail associated with the railway running rail, comprising:

a first member comprising a first jaw at an end thereof, a handle at an opposite end thereof, and a first intermediate portion extending between the first jaw and the handle;

a second member pivotally attached to the first member, the second member comprising a second jaw at an end thereof, a set of ratchet teeth at an opposite end thereof, and a second intermediate portion extending between the second jaw and the set of ratchet teeth, wherein the first and second jaws are configured to pivot towards each other and grip respective opposite side portions of a railway contact rail when the handle is pivoted in a first direction such that the second intermediate portion is in electrical contact with the railway contact rail; and a pawl extending from the first member that is configured to engage the set of ratchet teeth and hold the first and second jaws in contact with the respective opposite sides of the railway contact rail when the handle is pivoted in the first direction; and an electrically conductive cable in electrical communication with the clamp and the hand-held tool such that the railway contact rail is grounded to the railway running rail.

12. The apparatus of claim 11, further comprising an electrically conductive contact pad attached to the second intermediate portion that is configured to make electrical contact with the railway contact rail.

13. The apparatus of claim 11, further comprising a biasing member operatively associated with the pawl that is configured to urge the pawl into engagement with the set of ratchet teeth.

14. The apparatus of claim 13, further comprising a lever operatively associated with the pawl and configured to disengage the pawl from the set of ratchet teeth and allow movement of the handle in a second direction opposite to the first direction.

15. The apparatus of claim 11, wherein the first jaw comprises a roller configured to contact the railway contact rail.

16. The apparatus of claim 11, wherein the second jaw comprises a roller configured to contact the railway contact rail.

* * * * *